United States Patent
O'Sullivan et al.

(10) Patent No.: US 9,224,004 B2
(45) Date of Patent: *Dec. 29, 2015

(54) VARIABLE USER INTERFACE BASED ON DOCUMENT ACCESS PRIVILEGES

(71) Applicant: Google Inc., Mountain View, CA (US)

(72) Inventors: Joseph K. O'Sullivan, London (GB); Siraj Khaliq, San Francisco, CA (US); Adam M. Smith, San Francisco, CA (US); Alexander MacGillivray, San Francisco, CA (US); Joe Sriver, Edina, MN (US)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/454,514

(22) Filed: Aug. 7, 2014

(65) Prior Publication Data

US 2014/0344308 A1 Nov. 20, 2014

Related U.S. Application Data

(63) Continuation of application No. 13/739,314, filed on Jan. 11, 2013, now Pat. No. 8,832,150, which is a continuation of application No. 12/627,834, filed on Nov. 30, 2009, now Pat. No. 8,364,712, which is a continuation of application No. 10/953,496, filed on Sep. 30, 2004, now Pat. No. 7,664,751.

(51) Int. Cl.
*G06F 17/30* (2006.01)
*G06F 21/62* (2013.01)
*G06F 21/10* (2013.01)

(52) U.S. Cl.
CPC ........ *G06F 21/6218* (2013.01); *G06F 17/3087* (2013.01); *G06F 17/30864* (2013.01); *G06F 21/10* (2013.01); *G06F 2221/2111* (2013.01); *G06F 2221/2141* (2013.01)

(58) Field of Classification Search
CPC ........................ G06F 17/30864; G06F 17/3087

USPC ........................................................ 707/783
See application file for complete search history.

(56) References Cited

U.S. PATENT DOCUMENTS

| | | | |
|---|---|---|---|
| 5,181,162 | A | 1/1993 | Smith et al. |
| 5,276,901 | A | 1/1994 | Howell et al. |

(Continued)

FOREIGN PATENT DOCUMENTS

| | | |
|---|---|---|
| EP | 1225500 A2 | 7/2002 |
| JP | 06-059854 A | 3/1994 |

(Continued)

OTHER PUBLICATIONS

Amazon.com, Inc., "Press Release: Amazon.com Launches "Search Inside the Book" Enabling Customers to Discover-Books by Searching and Previewing the Text Inside", Oct. 23, 2003, 3 pages [online] [Retrieved on Jan. 4, 2005] Retrieved from the Internet <URL: http://phx.corporate-ir.netlphoenix.zhtml?c=97664&p=IROLNewsText&!=ReQular&id =462057&>.

(Continued)

*Primary Examiner* — Joshua Bullock
(74) *Attorney, Agent, or Firm* — Fenwick & West LLP

(57) ABSTRACT

Users may be presented with different viewing interfaces for a document based on a combination of factors relating to display rights possessed for the document and user specific information. In one implementation, the user's location is used to determine portions of the document that can be displayed to the user. More particularly, access privileges to a document for a user are determined based on geographical location information of the user and based on access rights possessed for the document. Portions of the document may then be formatted for display to the user based on the determined access privileges.

20 Claims, 11 Drawing Sheets

(56) References Cited

U.S. PATENT DOCUMENTS

| | | | |
|---|---|---|---|
| 5,572,643 A | 11/1996 | Judson | |
| 5,598,557 A | 1/1997 | Doner et al. | |
| 5,634,012 A | 5/1997 | Stefik et al. | |
| 5,892,900 A | 4/1999 | Ginter et al. | |
| 5,893,101 A | 4/1999 | Balogh et al. | |
| 5,930,801 A | 7/1999 | Falkenhainer et al. | |
| 5,960,448 A | 9/1999 | Reichek et al. | |
| 5,974,548 A * | 10/1999 | Adams | 713/186 |
| 6,012,087 A | 1/2000 | Freivald et al. | |
| 6,085,193 A | 7/2000 | Malkin et al. | |
| 6,122,741 A | 9/2000 | Patterson et al. | |
| 6,141,754 A | 10/2000 | Choy | |
| 6,236,991 B1 | 5/2001 | Frauenhofer et al. | |
| 6,237,099 B1 | 5/2001 | Kurokawa | |
| 6,292,798 B1 | 9/2001 | Dockter et al. | |
| 6,308,273 B1 | 10/2001 | Goertzel et al. | |
| 6,314,425 B1 | 11/2001 | Serbinis et al. | |
| 6,321,256 B1 | 11/2001 | Himmel et al. | |
| 6,473,752 B1 | 10/2002 | Fleming, III | |
| 6,516,315 B1 | 2/2003 | Gupta | |
| 6,578,037 B1 | 6/2003 | Wong et al. | |
| 6,636,242 B2 | 10/2003 | Bowman-Amuah | |
| 6,647,388 B2 | 11/2003 | Numao et al. | |
| 6,654,754 B1 | 11/2003 | Knauft et al. | |
| 6,658,423 B1 | 12/2003 | Pugh et al. | |
| 6,671,805 B1 | 12/2003 | Brown et al. | |
| 6,720,965 B1 | 4/2004 | Hirosawa et al. | |
| 6,799,302 B1 | 9/2004 | Sites | |
| 6,807,534 B1 * | 10/2004 | Erickson | 705/51 |
| 6,839,843 B1 | 1/2005 | Bacha et al. | |
| 6,971,017 B2 | 11/2005 | Stringer et al. | |
| 6,978,420 B2 | 12/2005 | Ching | |
| 6,978,445 B2 | 12/2005 | Laane | |
| 6,990,492 B2 | 1/2006 | Gupta | |
| 7,020,663 B2 | 3/2006 | Hay et al. | |
| 7,051,196 B2 | 5/2006 | Angelo et al. | |
| 7,082,573 B2 | 7/2006 | Apparao et al. | |
| 7,133,834 B1 | 11/2006 | Abelow | |
| 7,133,845 B1 | 11/2006 | Ginter et al. | |
| 7,219,309 B2 | 5/2007 | Kaasila et al. | |
| 7,290,285 B2 | 10/2007 | McCurdy et al. | |
| 7,316,032 B2 | 1/2008 | Tayebi et al. | |
| 7,366,718 B1 | 4/2008 | Pugh et al. | |
| 7,421,411 B2 | 9/2008 | Kontio et al. | |
| 7,437,351 B2 | 10/2008 | Page | |
| 7,461,158 B2 | 12/2008 | Rider et al. | |
| 7,475,242 B2 | 1/2009 | Baird et al. | |
| 7,515,717 B2 | 4/2009 | Doyle et al. | |
| 7,561,755 B2 | 7/2009 | O'Sullivan | |
| 7,603,355 B2 | 10/2009 | Whitten et al. | |
| 7,607,083 B2 | 10/2009 | Gong et al. | |
| 7,660,902 B2 | 2/2010 | Graham et al. | |
| 7,664,751 B2 | 2/2010 | O'Sullivan et al. | |
| 7,689,578 B2 | 3/2010 | Albornoz et al. | |
| 7,739,299 B2 | 6/2010 | Kii et al. | |
| 8,112,715 B2 | 2/2012 | Cragun et al. | |
| 8,364,712 B2 | 1/2013 | O'Sullivan et al. | |
| 8,543,564 B2 | 9/2013 | Conrad et al. | |
| 8,543,599 B2 | 9/2013 | Whitten et al. | |
| 8,639,721 B2 | 1/2014 | Whitten et al. | |
| 2002/0091584 A1 | 7/2002 | Clark et al. | |
| 2002/0169875 A1 | 11/2002 | Furui et al. | |
| 2003/0105668 A1 | 6/2003 | Segawa et al. | |
| 2003/0115481 A1 | 6/2003 | Baird et al. | |
| 2003/0196169 A1 | 10/2003 | Wittkotter et al. | |
| 2003/0233330 A1 | 12/2003 | Raley et al. | |
| 2004/0078422 A1 | 4/2004 | Toomey | |
| 2004/0122811 A1 * | 6/2004 | Page | 707/3 |
| 2004/0133793 A1 | 7/2004 | Ginter et al. | |
| 2004/0139327 A1 | 7/2004 | Brown et al. | |
| 2004/0167858 A1 | 8/2004 | Erickson | |
| 2004/0177044 A1 | 9/2004 | Peterka | |
| 2004/0267815 A1 | 12/2004 | De Mes | |
| 2005/0022019 A1 | 1/2005 | Medvinsky et al. | |
| 2005/0060549 A1 | 3/2005 | England et al. | |
| 2005/0076030 A1 | 4/2005 | Hada et al. | |
| 2005/0108176 A1 | 5/2005 | Jarol et al. | |
| 2005/0162668 A1 * | 7/2005 | Noda | 358/1.1 |
| 2005/0177716 A1 | 8/2005 | Ginter et al. | |
| 2005/0203916 A1 | 9/2005 | Hirose | |
| 2005/0246762 A1 | 11/2005 | Girouard et al. | |
| 2005/0262568 A1 | 11/2005 | Hansen et al. | |
| 2006/0061796 A1 | 3/2006 | O'Sullivan | |
| 2006/0075324 A1 | 4/2006 | Whitten et al. | |
| 2006/0085469 A1 | 4/2006 | Pfeiffer et al. | |
| 2006/0085761 A1 | 4/2006 | Allen et al. | |
| 2006/0089857 A1 | 4/2006 | Zimmerman et al. | |
| 2009/0060343 A1 | 3/2009 | Rosca | |

FOREIGN PATENT DOCUMENTS

| | | |
|---|---|---|
| JP | 09-214935 A | 8/1997 |
| JP | 2002-197294 A | 7/2002 |
| JP | 2003-032652 A | 1/2003 |
| JP | 2003-132087 A | 5/2003 |
| WO | WO 03/096179 | 11/2003 |

OTHER PUBLICATIONS

Amazon.com, Inc., "Search Inside the Book: FAQ", 2004, 3 pages [online] [Retrieved on Jan. 4, 2005] Retrieved from the Internet <URL: http://www.amazon.com/execlobidos/tglprowse/-/1 0197041/QidO/03D1103344905/sr%3D1-1/002-9086708-9426431>.

Amazon.com, Inc., "Search Inside the Book: How It Works", 3 pages [online] [Retrieved on Jan. 4, 2005] Retrieved from the Internet <URL: http://www.amazon.com/execlobidos/tg/browse/-/10197021/002-9086708-9426431>.

Bertino, E., et al., "Author-X: A Java-Based System for XML Data Protection", Data and Application Security, Springer, Boston, MA, © 2002, pp. 15-26.

Bertino, E., et al., "Secure and Selective Dissemination of XML Documents", ACM Transactions on Information and System Security, vol. 5, No. 3, Aug. 2002, pp. 290-331.

Bertino, E., et al., "Securing XML Documents with Author-X", IEEE Internet Computing, May/Jun. 2001, pp. 21-31, vol. 5, Issue 3.

Bertino, E., et al., "Specifying and Enforcing Access Control Policies for XML Document Sources", World Wide Web, vol. 3, No. 3, Springer, Netherlands, Nov. 2000, pp. 139-151.

Bertino, E., et al., "Controlled Access and Dissemination of XML Documents", WIDM 99, Kansas City, MO, © 1999, pp. 22-27.

Brewer, D.F.C., et al., "The Chinese Wall Security Policy," IEEE Symposium on Research in Security and Privacy, May 1989, pp. 206-214.

Broder, A., "A Taxonomy of Web Search", SIGIR Forum, Fall 2002, pp. 3-10, vol. 36, No. 2.

Cohen, J., "A General Overview of Two New Technologies for Playing Protected Content on Portable or Networked Devices", Microsoft Corporation, Jun. 2004, pp. i-iii and 1-8.

Damiani, E., et al., "A fine-grained access control system for XML documents", May 2002, pp. 169-202, vol. 5 Issue 2, ACM Press.

De Bra, P., "Design Issues in Adaptive Hypermedia Application Development", Proc. of the 2nd Workshop on Adaptive Systems and User Modeling on the World Wide Web, TUE Computing Science Report 99-07, 1999, pp. 1-15.

Fu, X., et al., "Mining Navigation History for Recommendation", IUI 2000, pp. 106-112, New Orleans, LA.

Hausheer, D., et al., "Design of a Distributed P2P-based Content Management Middleware", EUROMICRO '03, IEEE Computer Society, Sep. 1-6, 2003, pp. 173-180.

Haveliwala, T., "Topic-Sensitive PageRank: A Context-Sensitive Ranking Algorithm for Web Search", IEEE Transactions on Knowledge and Data Engineering, Jul./Aug. 2003, pp. 784-796, vol. 15, No. 4.

Kiyomitsu, H., et al., "Web Reconfiguration by Spatio-Temporal Page Personalization Rules Based on Access Histories", SAINT 2001, Jan. 8-12, 2001, pp. 75-82, San Diego, CA.

(56) References Cited

OTHER PUBLICATIONS

Laine-Cruzel, S., et al., "Improving Information Retrieval by Combining User Profile and Document Segmentation", Information Processing and Management, vol. 32, No. 3, © 1996, pp. 305-315.
Lieberman, H., "Letizia: An Agent That Assists Web Browsing", AAAI Technical Report FS-95-03, 1995, pp. 97-102.
Miklau, G., et al., "Controlling Access to Published Data Using Cryptography", Proc. of the 29th VLDB Conf., Berlin, Germany, 2003, pp. 898-909.
Rabinovich, M., et al., "A Dynamic Object Replication and Migration Protocol for an Internet Hosting Service", ICDCS, May 31-Jun. 4, 1999, pp. 101-113.
Simon, J., et al., "A Digital Licensing Model for the Exchange of Learning Objects in a Federated Environment", WEC 2004, IEEE Computer Society, Jul. 6, 2004, pp. 46-53.
Yu, T., et al., "Compressed Accessibility Map: Efficient Access Control for XML", Proc. of the 28th VLDB Conf., Hong Kong, China, 2002, pp. 478-489.
Australian Office Action, Australian Patent Application No. 2005291883, Apr. 20, 2010, 3 Pages.
Canadian Office Action, Canadian Patent Application No. 2,582,100, Nov. 28, 2013, 2 Pages.
Canadian Office Action, Canadian Patent Application No. 2,582,100, May 16, 2012, 3 pages.
Chinese Reexamination Decision, Chinese Patent Application No. 200580036543.8, May 28, 2013, 23 Pages.
Chinese Office Action, Chinese Patent Application No. 200580036543.8, Jun. 13, 2012, 9 pages.
Chinese Office Action, Chinese Patent Application No. 200580036543.8, Mar. 18, 2010, 8 pages.
Chinese Office Action, Chinese Patent Application No. 200580036543.8, Nov. 21, 2008, 5 pages.
Chinese Office Action, Chinese Patent Application No. 200580036543.8, Jun. 6, 2008, 23 pages.
European Office Action, European Patent Application No. 05803667.4, Mar. 18, 2014, 5 pages.
European Office Action, European Patent Application No. 05803667.4, Jan. 15, 2010, 3 pages.
European Office Action, European Patent Application No. 05803667.4, Aug. 31, 2007, 4 pages.
Indian Office Action, Indian Patent Application No. 640/MUMNP/2007, Nov. 24, 2008, 6 pages.
Japanese Office Action, Japanese Patent Application No. JP P2007-534819, Apr. 26, 2011, 6 Pages.
Korean Office Action, Korean Patent Application No. KR 10-2007-7009858, Nov. 23, 2011, 5 pages.
Korean Office Action, Korean Patent Application No. KR 10-2007-7009858, Mar. 23, 2011, 5 Pages.
Notification of Transmittal of the International Search Report and Written Opinion, PCT/US2005/035289, Mar. 7, 2006, 8 pages.
Office Action for U.S. Appl. No. 13/614,368, May 2, 2013, 19 Pages.
Office Action for U.S. Appl. No. 12/501,735, Jan. 2, 2013, 25 Pages.
Office Action for U.S. Appl. No. 12/501,735, May 17, 2012, 24 Pages.
Office Action for U.S. Appl. No. 12/501,735, Mar. 4, 2011, 23 Pages.
Office Action for U.S. Appl. No. 12/501,735, Sep. 16, 2010, 19 Pages.
Office Action for U.S. Appl. No. 10/956,564, Oct. 28, 2008, 21 Pages.
Office Action for U.S. Appl. No. 10/956,564, Apr. 25, 2008, 23 Pages.
Office Action for U.S. Appl. No. 10/956,564, Oct. 15, 2007, 17 Pages.
Office Action for U.S. Appl. No. 10/956,564, Apr. 12, 2007, 14 Pages.
Joseph K. O'Sullivan, Co-pending U.S. Appl. No. 10/948,734, entitled "Image Distortion for Content Security", filed Sep. 22, 2004.
Alma W. Whitten et al., Co-pending U.S. Appl. No. 10/956,564, entitled "Variably Controlling Access to Content", filed Oct. 1, 2004.
Office Action for CA Application No. 2,582,100, Jan. 6, 2015, 3 pages.
Summons to Attend Oral Proceedings pursuant to Rule 115(1) EPC for EP Application No. EP 05792547.1, Jan. 16, 2015, 7 pages.
Office Action for U.S. Appl. No. 13/739,314, Jun. 11, 2013, 16 pages.
Office Action for U.S. Appl. No. 13/739,314, Jan. 10, 2014, 14 pages.
Office Action for U.S. Appl. No. 10/953,496, Jun. 12, 2007, 31 pages.
Office Action for U.S. Appl. No. 10/953,496, Apr. 15, 2009, 29 pages.
Office Action for U.S. Appl. No. 10/953,496, May 14, 2008, 24 pages.
Office Action for U.S. Appl. No. 10/953,496, Oct. 3, 2008, 28 pages.
Office Action for U.S. Appl. No. 10/953,496, Nov. 16, 2007, 22 pages.
Office Action for U.S. Appl. No. 10/953,496, Dec. 5, 2006, 28 pages.
Office Action for U.S. Appl. No. 12/627,834, Oct. 26, 2011, 19 pages.
Office Action for U.S. Appl. No. 12/627,834, Apr. 11, 2011, 15 pages.
Office Action for U.S. Appl. No. 12/627,834, Dec. 28, 2010, 14 pages.
Office Action for U.S. Appl. No. 12/627,834, Jul. 20, 2010, 6 pages.
Office Action for U.S. Appl. No. 12/627,834, Apr. 23, 2012, 16 pages.
Communication Pursuant to Article 94(3) EPC for European Patent Application No. EP 05803667.4, Feb. 17, 2015, 5 Pages.

* cited by examiner

CHAPTER I

YOU don't know about me without you have read a book by the name of The Adventures of Tom Sawyer; but that ain't no matter. That book was made by Mr. Mark Twain, and he told the truth, mainly. There was things which he stretched, but mainly he told the truth. That is nothing. I never seen anybody but lied one time or another, without it was Aunt Polly, or the widow, or maybe Mary. Aunt Polly -- Tom's Aunt Polly, she is -- and Mary, and the Widow Douglas is all told about in that book, which is mostly a true book, with some stretchers, as I said before.

Now the way that the book winds up is this: Tom and me found the money that the robbers hid in the cave, and it made us rich. We got six thousand dollars apiece -- all gold. It was an awful sight of money when it was piled up. Well, Judge Thatcher he took it and put it out at interest, and it fetched us a dollar a day apiece all the year round -- more than a body could tell what to do with. The Widow Douglas she took me for her son, and allowed she would sivilize me; but it was rough living in the house all the time, considering how dismal regular and decent the widow was in all her ways; and so when I couldn't stand it no longer I lit out. I got into my old rags and my sugar-hogshead again, and was free and satisfied. But Tom Sawyer he hunted me up and said he was going to start a band of robbers, and I might join if I would go back to the widow and be respectable. So I went back.

FRONT COVER
TOC
BACK COVER
PAGE

FIG. 8

GEORGE C. MARSHALL

*former U.S. Secretary of State*
SPEAKING AT HARVARD UNIVERSITY JUNE 5, 1947

I need not tell you, gentlemen, that the world situation is very serious. That must be apparent to all intelligent people. I think one difficulty is that the problem is one of such enormous complexity that the very mass of facts presented to the public by press and radio make it exceedingly difficult for the man in the street to reach a clear appraisement of the situation. Furthermore, the people of this country are distant from the troubled areas of the earth and it is hard for them to comprehend the plight and consequent reactions of the long-suffering peoples, and the effect of those reactions on their governments in connection with our efforts to promote peace in the world.

In considering the requirements for the rehabilitation of Europe the physical loss of life, the visible destruction of cities, factories, mines and railroads was correctly estimated, but it has become obvious during recent months that this visible destruction was probably less serious than the destruction of the entire fabric of European economy. For the past ten years conditions have been highly abnormal.

The feverish preparations for war and the more feverish maintenance of the war effort engulfed all aspects of national economies. Machinery has fallen into disrepair or is entirely obsolete. Under the arbitrary and destructive Nazi rule, virtually every possible enterprise was geared into the German war machine. Long-standing commercial ties, private institutions, banks, insurance companies and shipping companies disappeared, through loss of capital, absorption through nationalization or simple destruction.

In many countries, confidence in the local currency has been severely shaken. The breakdown of the business structure of Europe during the war was complete. Recovery has been seriously retarded by the fact that two years after the close of hostilities a peace settlement with Germany and Austria has not been agreed upon.

FRONT COVER
TOC
BACK COVER
PAGE 

FIG. 9

HARNESSING THE RAGE BY DR. BRUCE BANNER

EXCERPT FROM HARNESSING THE RAGE

109 REFERENCES TO MEMORY IN THIS DOCUMENT. THREE VIEWABLE EXCERPTS AVAILABLE.

PAGE 5 did occur when he was required to process digits during the delay; the more demanding the processing, the greater the mistakes. Dale (1973) has studied memory for the location of a dot in a field 1 foot square. The field was illuminated from memory, with the dot presented as a shadow on a sheet of paper laid over the field. After

PAGE 15 were more likely to report (wrongly) that glass was broken. The most extreme view of the role of language in visual memory is represented by the linguistic relativity hypothesis, which stems from the work of the linguist Benjamin Lee Whorf. Whorf (1956) argues that language is not simply a way of expressing our view of

PAGE 28

The time course is very different from that observed with iconic memory which would in any case have been masked in this situation by the visually presented interpolated digits.

It might be argued, however, that a system which handles the retention of something as basic as the location of a single dot may

FIG. 10

VARIABLE USER INTERFACE BASED ON DOCUMENT ACCESS PRIVILEGES

BACKGROUND

A. Field of the Invention

Systems and methods described herein relate to data formatting and presentation and, more particularly, to techniques for presenting textual and graphical material.

B. Description of Related Art

Modern computer networks, and in particular, the Internet, have made large bodies of information widely and easily available. Free Internet search engines, for instance, index many millions of web documents that are linked to the Internet. A user connected to the Internet can enter a simple search query to quickly locate web documents relevant to the search query.

One category of content that is not widely available on the Internet, however, are the more traditional printed works of authorship, such as books and magazines. Before presenting this type of digital content to users, the content may first be scanned using an optical scanner. Once scanned, optical character recognition (OCR) may be used to convert text in the scanned digital images of the pages of the content to a searchable digital form.

When transmitting the scanned/OCR'ed version of the content (e.g., books or magazines) to users, the content provider may only be able to lawfully provide certain portions of the content to the users. For example, the content provider may provide certain books that are in the public domain and other documents for which the content provider does not have full legal rights. Accordingly, the portions of the book that the content provider chooses to provide to the users may vary.

SUMMARY OF THE INVENTION

According to one aspect, a method includes determining access privileges to a document for a user based on geographical location information of the user and based on access rights possessed for the document. The method further includes formatting portions of the document for display to the user based on the determined access privileges and transmitting the formatted portions of the document to the user.

According to another aspect, a method includes receiving a request for a document from a user, receiving information relating to the user, and determining viewable portions of the document, as governed by copyright laws, based on the information relating to the user. The method further includes making available the viewable portions of the document to the user.

According to yet another aspect, a system includes a search engine configured to receive search queries and return links to documents relevant to the search queries. The system further includes a document browsing component configured to, in response to requests for one or more of the documents relevant to the search query, determine access privileges to the one or more of the documents on a per-user basis based on geographical location information of the user. The document browsing component additionally transmits portions of the one or more of the documents permitted by the determined access privileges to the user.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 8 is a diagram of an exemplary document interface presented to a user that requests a document for which full access privileges were determined;

FIG. 9 is a diagram of an exemplary document interface presented to a user that requests a document for which partial access privileges were determined;

FIG. 10 is a diagram of an exemplary document interface presented to a user that requests a document for which restricted access privileges were determined.

DETAILED DESCRIPTION

The following detailed description of the invention refers to the accompanying drawings. The detailed description does not limit the invention.

Overview

Figure 1:
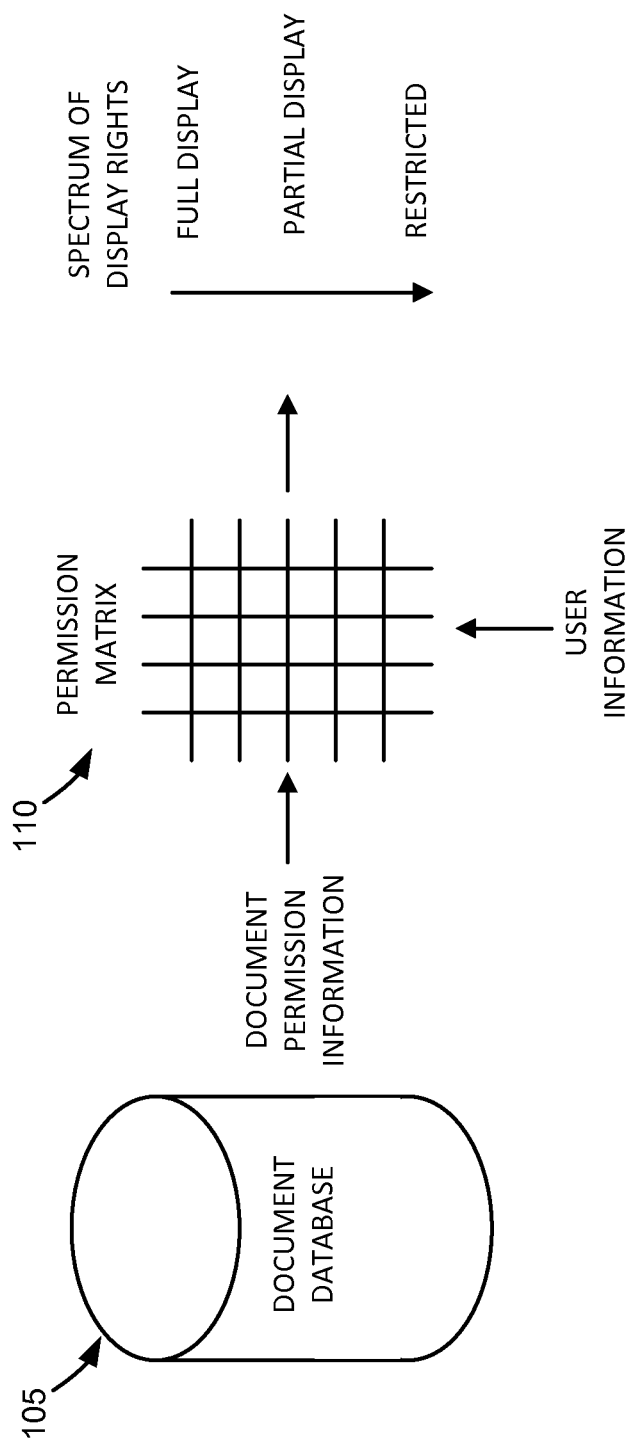
FIG. 1 is a diagram illustrating general concepts consistent with aspects of the invention.

FIG. 1 is a diagram illustrating general concepts consistent with aspects of the invention. A document database 105 may store a number of documents, such as books, magazines, or catalogs, that are made electronically available to end users. For example, database 105 may function in the context of an on-line printed document search engine or repository.

The ability to make the documents in database 105 available to the end users may be limited by the display rights possessed by the content provider (i.e., the operator of database 105). Copyright laws, business choices, or contractual restrictions may limit what is desired to be provided to the end users. The portions of the documents in database 105 that can be shown to a particular end user may be determined based on a number of factors, such as: (1) the location of the user (e.g., users in different countries/legal jurisdictions may be subject to different copyright requirements), (2) the permissions that the content provider has for the document being requested, (3) the type of content, and (4) the user's security status or state (e.g., whether the user is a registered user of a particular web site or a member of a particular group).

Consistent with aspects of the invention, users may be presented with different viewing interfaces each designed to present the available portions of the document, such as the portions determined based on the above-listed factors. The intersection of these factors can be conceptualized as permission matrix 110. The output of permission matrix 110 defines the spectrum of display rights available to the particular user. For a public domain document, for example, the display rights may be "full display," indicating that the entire document can be shown to the users. Other document/end user combinations may correspond to a lower level of display rights, down to as low as "restricted" viewing, which may correspond to a minimum viewing permission.

Exemplary System Overview

Figure 2:
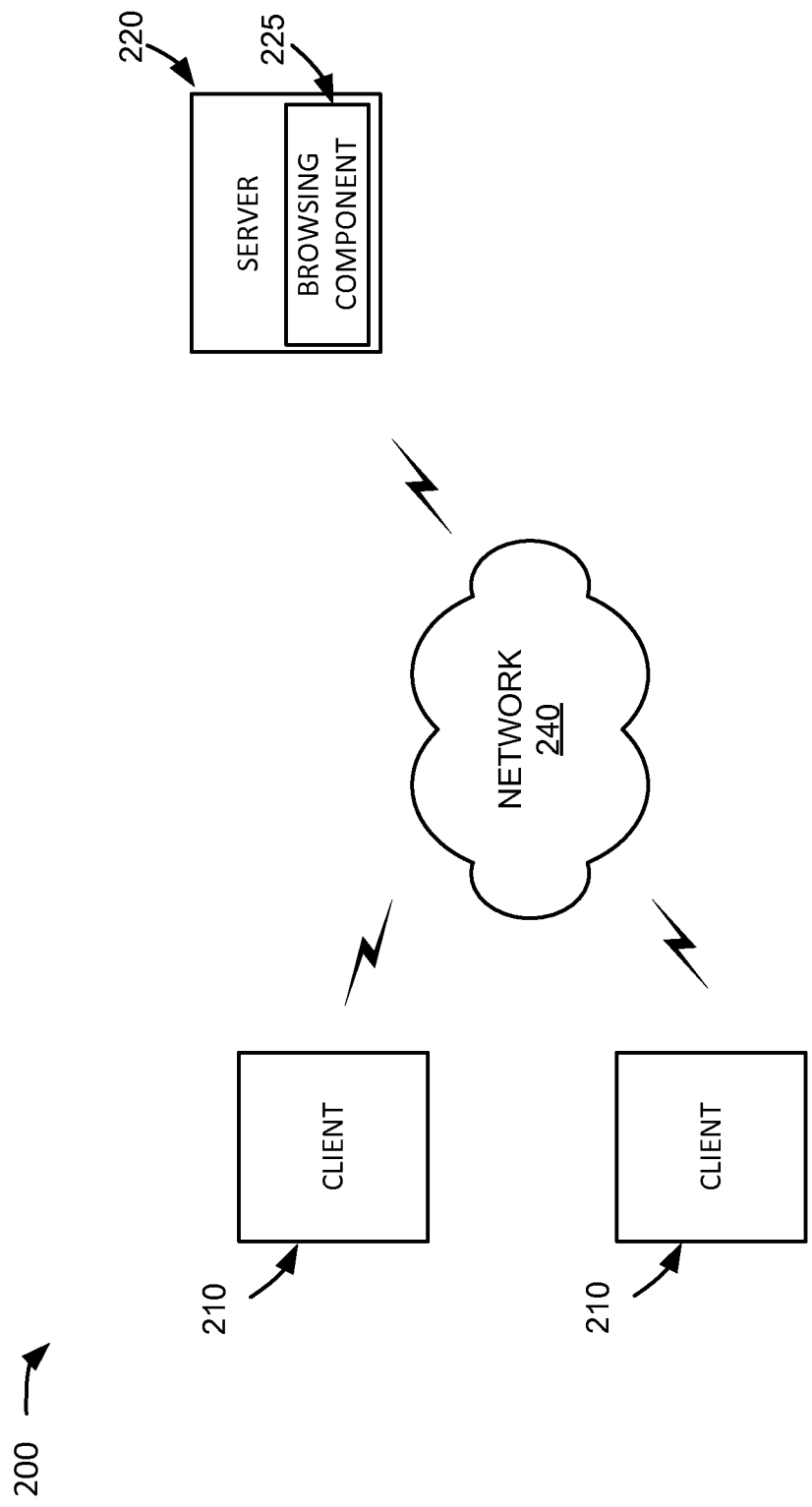
FIG. 2 is an exemplary diagram of a network.

FIG. 2 is an exemplary diagram of a system 200 in which concepts consistent with the principles of the invention may be implemented. System 200 may include multiple clients 210 connected to a server 220 via a network 240. Network 240 may include a local area network (LAN), a wide area network (WAN), a telephone network, such as the Public Switched Telephone Network (PSTN), an intranet, the Internet, or a combination of networks. Two clients 210 and one server 220 have been illustrated as connected to network 240 for simplicity. In practice, there may be more clients and/or servers. Also, in some instances, a client may perform one or more functions of a server and a server may perform one or more functions of a client.

A client 210 may include a device such as a wireless telephone, a personal computer, a personal digital assistant (PDA), a lap top, or another type of computation or communication device, a thread or process running on one of these devices, and/or an object executable by one of these devices. Server 220 may include a server device that processes, searches, and/or maintains documents and images in a manner consistent with the principles of the invention. Clients 210 and server 220 may connect to network 240 via wired, wireless, or optical connections.

Server 220 may include a document browsing component 225 that transmits images corresponding to documents, such as image pages of books, magazines, or catalogs, to clients 210. In addition to transmitting images of the pages of the documents, document browsing component 225 may provide information representing the text contained on the pages, such as ASCII text characters corresponding to the documents' pages. These documents may be gathered by document browsing component 225 in a number of ways, such as by optically scanning the documents or by receiving the documents from a third party, etc.

In one implementation, document browsing component 225 may include, or be coupled with, a search engine that allows clients to search a database of the documents via textual search queries.

Exemplary Client/Server Architecture

Figure 3:
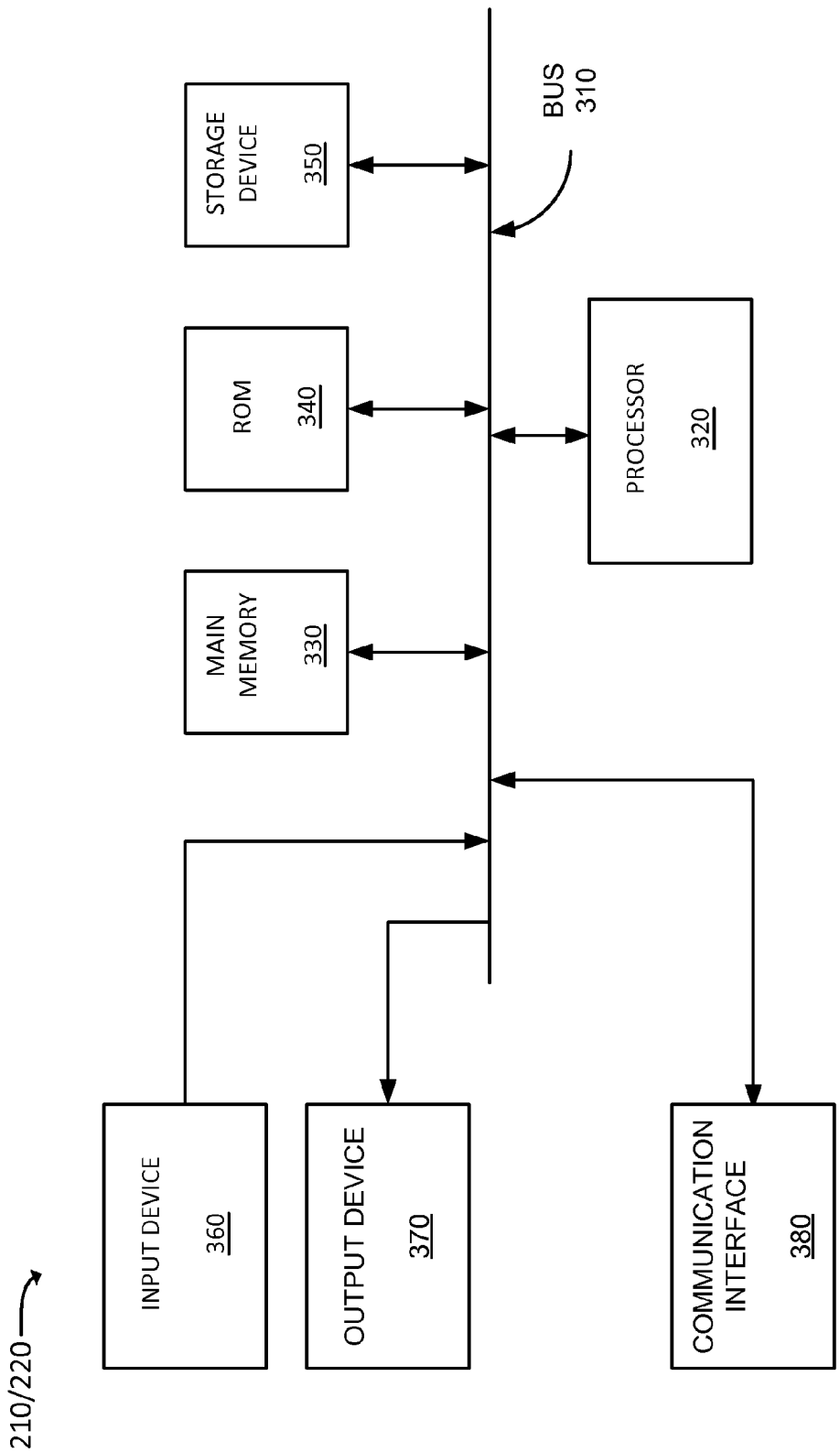
FIG. 3 is an exemplary diagram of a client or server shown in FIG. 2.

FIG. 3 is an exemplary diagram of a client 210 or server 220. Client/server 210/220 may include a bus 310, a processor 320, a main memory 330, a read only memory (ROM) 340, a storage device 350, an input device 360, an output device 370, and a communication interface 380. Bus 310 may include conductors that permit communication among the components of client/server 210/220.

Processor 320 may include conventional processors, microprocessors, or processing logic that interpret and execute instructions. Main memory 330 may include a random access memory (RAM) or another type of dynamic storage device that stores information and instructions for execution by processor 320. ROM 340 may include a conventional ROM device or another type of static storage device that stores static information and instructions for use by processor 320. Storage device 350 may include a magnetic and/or optical recording medium and its corresponding drive.

Input device 360 may include one or more conventional mechanisms that permit a user to input information to client/server 210/220, such as a keyboard, a mouse, a pen, voice recognition and/or biometric mechanisms, etc. Output device 370 may include one or more conventional mechanisms that output information to the user, including a display, a printer, a speaker, etc. Communication interface 380 may include any transceiver-like mechanism that enables client/server 210/220 to communicate with other devices and/or systems. For example, communication interface 380 may include mechanisms for communicating with another device or system via a network, such as network 240.

Server 220, consistent with the principles of the invention, may implement additional document browsing component 225. Document browsing component 225 may be stored in a computer-readable medium, such as memory 330. A computer-readable medium may be defined as one or more physical or logical memory devices and/or carrier waves.

The software instructions defining document browsing component 225 may be read into memory 330 from another computer-readable medium, such as data storage device 350, or from another device via communication interface 380. The software instructions contained in memory 330 may cause processor 320 to perform processes that will be described later. Alternatively, hardwired circuitry or other logic may be used in place of, or in combination with, software instructions to implement processes consistent with the invention. Thus, implementations consistent with the principles of the invention are not limited to any specific combination of hardware circuitry and software. Additionally, multiple computing devices may function together to implement the functionality of a single server 220 or document browsing component 225.

Operation of Document Browsing Component 225

Figure 4:
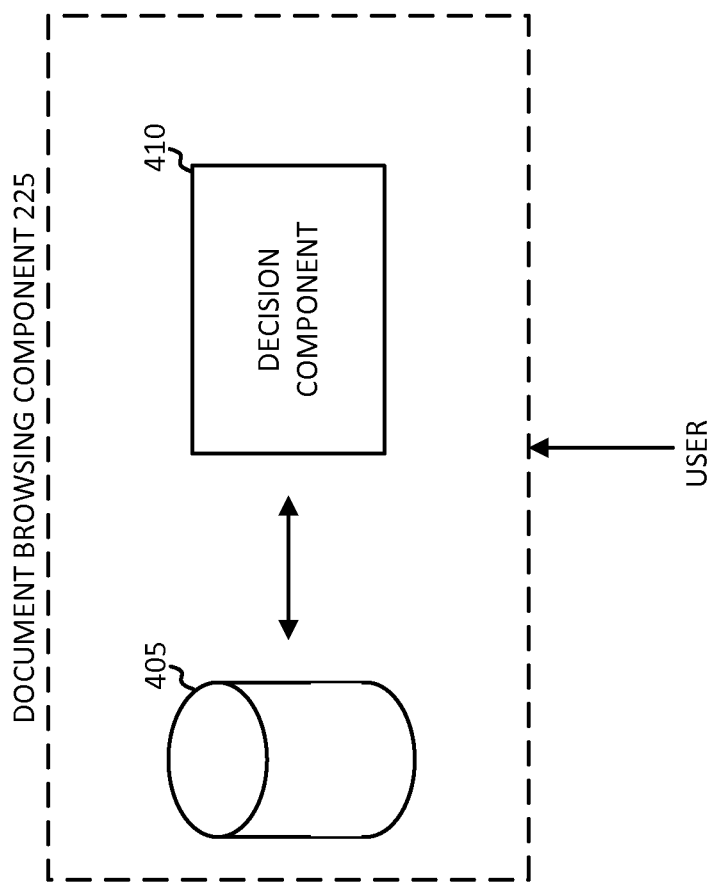
FIG. 4 is a diagram conceptually illustrating the document browsing component shown in FIG. 2.

FIG. 4 is a diagram conceptually illustrating document browsing component 225. Document browsing component 225 may include a document database 405 and a decision component 410. Database 405 may store documents and information related to the documents. Decision component 410 may generally decide which portions of the documents in database 405 may be transmitted to users requesting the documents. As previously mentioned, this decision may be based on a number of factors, such as the copyright-based or permission-based rights associated with the document.

Figure 5:
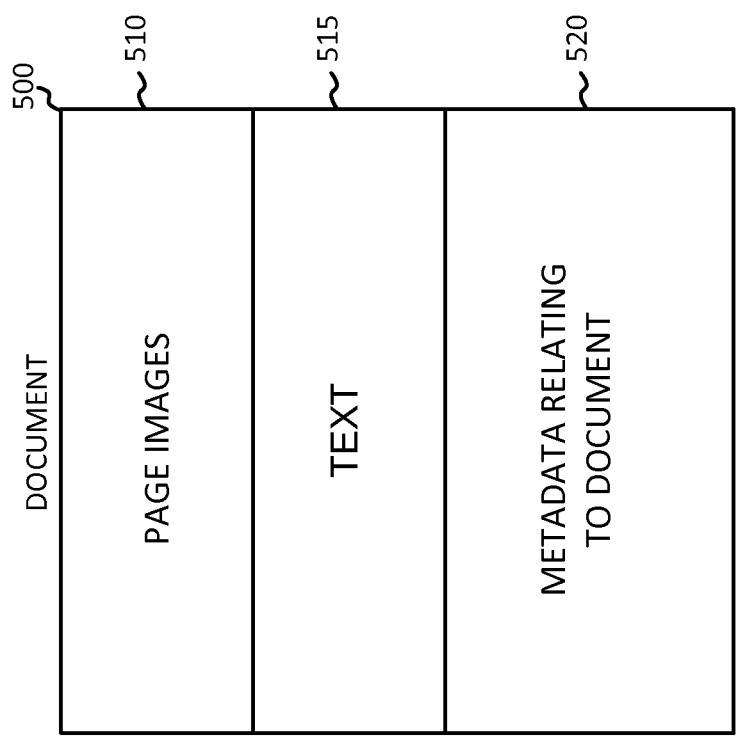
FIG. 5 is a diagram illustrating portions of an exemplary document stored in the database shown in FIG. 4.

As mentioned, database 405 may store documents and information related to the documents. FIG. 5 is a diagram illustrating portions of an exemplary document 500 stored in database 405. The information defining document 500 may include images 510 of pages of the document, text 515 of the document, and metadata 520 relating to the document. In some implementations, images 510 or text 515 may not be present. That is, a document 500 may include either page images 510 or text 515.

Images 510 may include images of the pages of the document. By storing images 510, users wishing to view the document can see the document in the form that the document was originally printed. The images may be obtained, for example, by optically scanning each page of the document or by obtaining the images from the publisher, author, or another source.

Text 515 may include the text in document 500 in a machine-readable format. For example, text 515 may include an ASCII (American Standard Code for Information Interchange) representation of the text of document 500. Text 515 may be obtained in a number of ways, such as by performing OCR on images 510, by manually typing the text of the document, or by obtaining the text from the publisher, author, or another source.

Metadata 520 may include additional information relating to document 500. For example, metadata 520 may include publisher information, the ISBN of document 500 (when document 500 is a document, such as a book, that has an ISBN), summary information describing document 500, links to additional information about document 500 (such as Web links), etc. Consistent with an aspect of the invention, metadata 520 may include information relating to access rights associated with or possessed for document 500.

Figure 6:
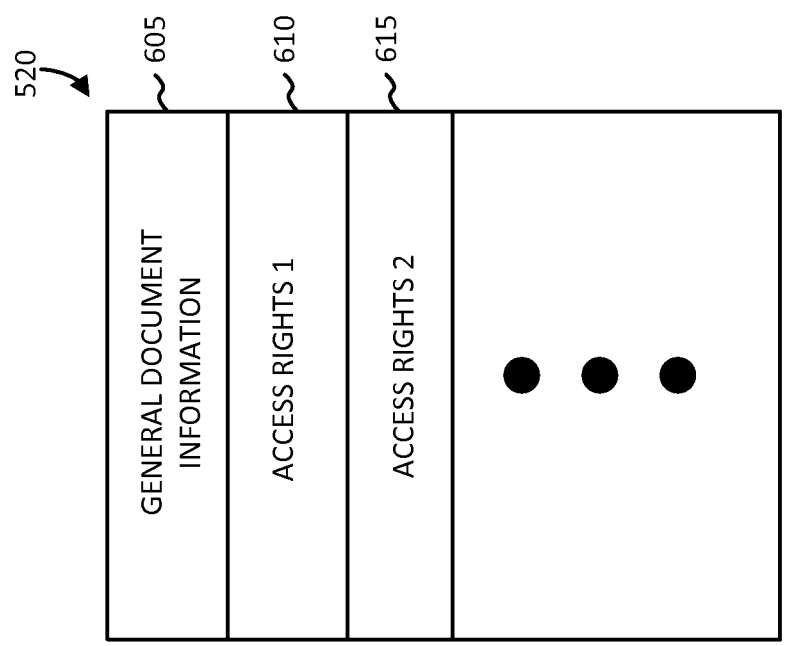
FIG. 6 is diagram illustrating an exemplary set of metadata for a document.

FIG. 6 is diagram illustrating an exemplary set of metadata 520 for a document. As mentioned, metadata 520 may include general information 605 about the document, such as, for a book, an ISBN, the publisher, author biographical information, etc. Metadata 520 may also include a number of fields relating to access privileges associated with the document. The access rights may vary by geographical location, such as by country or jurisdiction. For example, access right 610 may apply to readers in the United States and may indicate that such readers have a first set of access rights. Access rights 615 may apply to readers in Canada and may indicate that such readers have a second set of access rights. For example, readers from the United States may be given "partial" access to the document while readers in Canada may be given "full" access to the document. This may be because the content provider has been granted full rights in the document from the publisher for Canadian readers but has not been granted rights in the United States, so the content provider may choose to only enable fair use display for readers in the United States.

More generally, metadata 520 may include additional information relating to display rights granted from the publisher/content source to the content provider. Examples of such additional information include an indication of whether images or photos should be blocked in documents, a list of domains from which advertisements should not be used, a reference to a logo or link that should be displayed with the document, whether advertisements should be displayed, information defining a "buy the book" link from which the user can purchase a copy of the document, or information defining a link to promotional material. This additional information may be used when formatting the document for presentation to the user.

Additionally, different display standards may be applied to readers in different geographies. For instance, both readers in Canada and the United States may have display ability based on legal or other criteria, but the limited display ability in the two countries may be different. One of ordinary skill in the art will recognize that the various display types available to the users in different locations can be specified for a particular document or a group of documents in a number of different ways. Storing the access rights, which translate into display types, in fields 610 and 615, as described above, is one exemplary technique.

Figure 7:
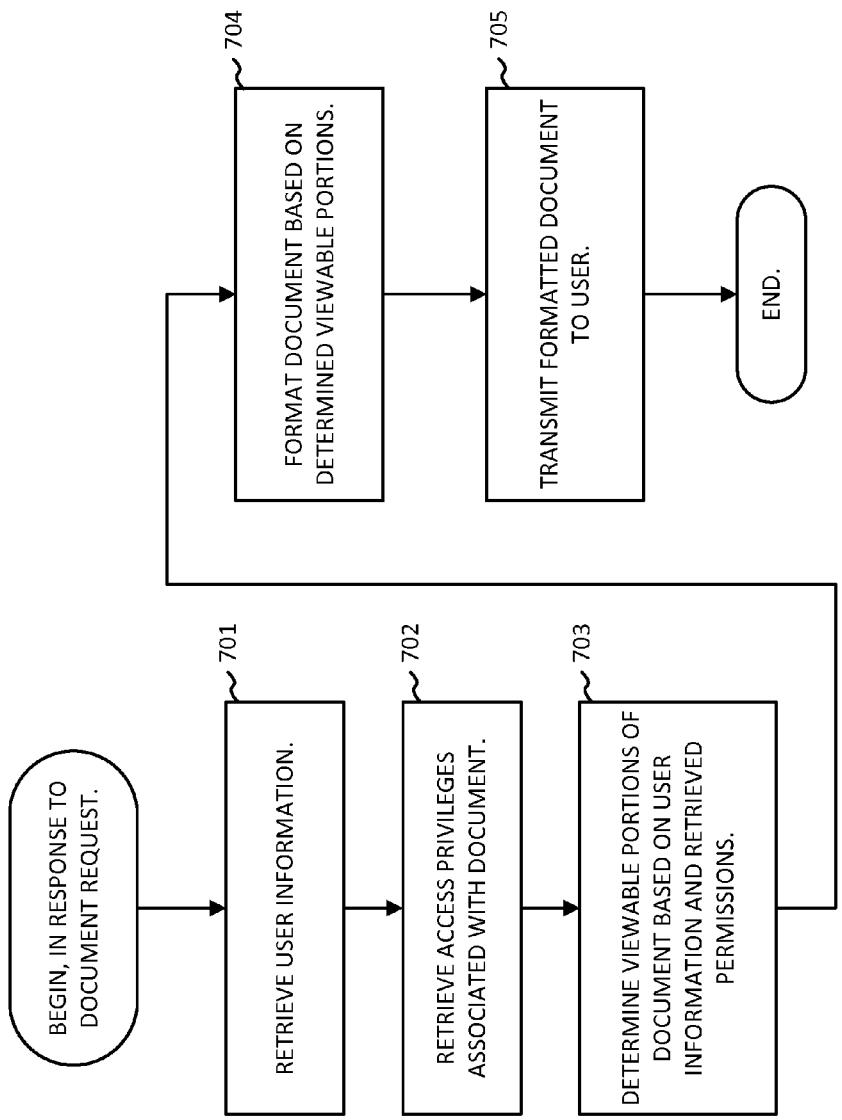
FIG. 7 is a flow chart illustrating exemplary operations of the document browsing component shown in FIG. 2.

FIG. 7 is a flow chart illustrating exemplary operations of document browsing component 225. The operations of FIG. 7 may begin whenever a user requests a document. A document may be requested, for example, pursuant to a keyword search of a corpus of indexed documents or pursuant to a user request for a specific document.

User information may be determined (act 701). In one implementation, the user information may include the location of the user. The user's location may be determined based on the Internet Protocol (IP) address associated with the user. Alternately, the domain that is being browsed may be used to determine the location. Information other than, or in addition to, the user location may also be used as user information. For example, whether the user accepts cookies may be determined and included as part of the user information. Other user security or state information may also be used. For example, registered users that have successfully logged-on may be eligible to view different portions of a document than non-registered users.

The access rights associated with the document may also be retrieved (act 702). As previously discussed, the access rights may be stored as metadata in database 405. Based on the user information and the access rights associated with the document, decision component 410 may determine what portions of the document are eligible to be shown to the particular user (act 703). The user information and the access rights associated with the document may be thought of as forming permission matrix 110 (FIG. 1), which defines the access privileges that can be granted to the user for the requested document. In some implementations, the content of the document itself may be taken into consideration when determining the access privileges that can be granted to the user. For example, fair use display for a book may be chosen to be a number of paragraphs or pages of text, while the fair use display for a short poem may be chosen to be only a line or two from the poem.

The portions of the document that can be shown to the user may then be appropriately formatted and transmitted to the user (acts 704 and 705). This formatting can be performed in a number of ways. For example, for a given document, multiple versions of the document, each including a select subset of the document, may be pre-formatted and stored. The appropriate version may then be selected and transmitted to the user in acts 704 and 705. Alternatively, the formatting can be performed on the fly. The formatting can, for instance, be a "smart" formatting in which portions of the document that are most relevant to the user (such as portions that include terms of a search query) are selected and formatted for presentation to the user.

In some implementations, photographs contained in the documents may be given special attention when formatting and transmitting the documents to the user. For example, the content source of the document may give permission to display the text of a document but not photographs in the document. The photographs may be individually obscured or deleted from the document.

FIG. 8 is a diagram of an exemplary document interface 800 presented to a user that requests a document for which full access privileges were determined in acts 701-703. In this case, the document is the first page of the book "The Adventures of Huckleberry Finn," by Mark Twain. This book is in the public domain and may, thus, be freely shown to users requesting the book. The document interface may be presented using a web browser or other viewing software at clients 210. In the example shown in FIG. 8, the interface includes a page image 805 of the first page of the book. Graphical buttons 810 and 815 may be provided for requesting the previous page and the next page, respectively, of the book. An exemplary set of other navigation controls 830 may also be provided in interface 800. As shown, these controls 830 include links to take the user to the front cover, table of contents (TOO), back cover, or to a specified page of the document.

FIG. 9 is a diagram of an exemplary document interface 900 presented to a user that requests a document for which less than full access privileges ("partial access privileges") were determined. In this example, the document is a book that includes speeches of famous persons. Assume that based on the user's country, the fact that client 210 corresponding to the user accepts cookies, and the rights granted by the content source of the book, document browsing component 225 determines that the user is permitted to view up to 75 percent of any page in the document. Document browsing component may enforce this restriction in a number of ways. For example, as shown, the formatted image returned to the user may include portions, such as portion 905, that are blurred, blocked, or otherwise not readable. Navigation controls 930, similar to navigation controls 830, may additionally be provided to assist the user in navigating through the document.

One of ordinary skill in the art will recognize that "partial access" for a document can be provided in numerous ways in addition to that shown in FIG. 9. For example: in a specified time period (e.g., 24 hours) the user may only be permitted to view a certain portion (e.g., 10%) of the document; only pre-designated portions of the document may be viewable; the document may be stamped or watermarked with lettering such as "copyrighted"; etc. Different "partial access" interfaces may be presented to different users based on their location, other user specific information, and based on access privileges for the requested document.

FIG. 10 is a diagram of an exemplary document interface 1000 for which a user has even less access privileges than those of FIG. 9 ("restricted access"). A restricted access user may be one in which the document and user information dictates that only minimal access to the document may be given, such as a document in which only fair use rights are allowed. In this example, assume the user is performing a keyword search for the word "memory" in a hypothetical book "Harnessing the Rage." Images of select portions of three pages are shown that include hits for this term, pages 5, 15, and 28. From each page, a small snippet of text 1040 is presented to the user, showing the keyword in the context of the page.

The exemplary interfaces shown in FIGS. 8-10 illustrate an exemplary spectrum of possible document access privileges that may be granted to a user based on user specific information and general access rights of the document. Although three discrete steps in the spectrum were shown, in general, the spectrum of possible access rights can be conceptualized as a continuous one ranging from full access to restricted or no access.

Exemplary Implementation

Figure 11:
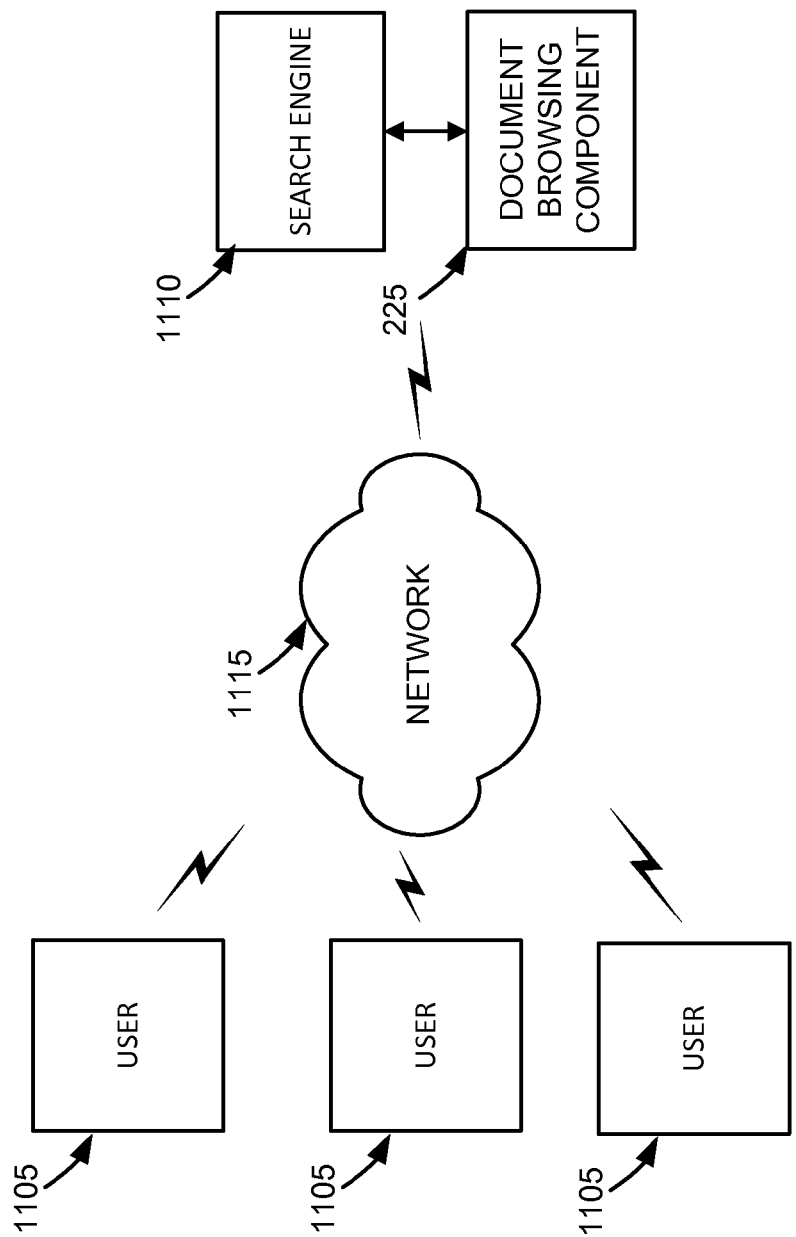
FIG. 11 is a diagram illustrating an exemplary implementation of document browsing component implemented in the context of a printed-material search engine.

FIG. 11 is a diagram illustrating an exemplary implementation of document browsing component 225 implemented in the context of a printed-material search engine. A number of users 1105 may connect to a search engine 1110 over a network 1115, such as the Internet. Search engine 1110 may be a search engine that returns links to a ranked set of documents, from a database, that are related to a user query.

The user may select one of the returned document links for viewing. In response, document browsing component 225 may perform the acts described with regard to FIG. 7 to, thus, allow the user to view the requested document to the extent permitted by the user's information and by the access privileges corresponding to the requested document.

CONCLUSION

Various techniques, as described above, are used to present different user interfaces to documents based on the access privileges determined for the documents.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the present invention is not limiting of the present invention. Thus, the operation and behavior of the aspects were described without reference to the specific software code—it being understood that a person of ordinary skill in the art would be able to design software and control hardware to implement the aspects based on the description herein.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, although many of the operations described above were described in a particular order, many of the operations are amenable to being performed simultaneously or in different orders. Also, the graphical user interfaces shown above are exemplary. Other graphical designs or layouts could be used to accomplish same or like functionality.

No element, act, or instruction used in the present application should be construed as critical or essential to the invention unless explicitly described as such. Also, as used herein, the article "a" is intended to potentially allow for one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed:

1. A method comprising:
   receiving a search query from a client used by a user;
   identifying portions of a document that are relevant to the search query;
   deriving user access privileges to the document based on information associated with the user and access rights associated with the document;
   determining based on the derived user access privileges to the document and display right information for the document, one or more first portions of the document relevant to the search query to be readable by the user and one or more second portions of the document relevant to the search query to be unreadable by the user;
   formatting the document based on the obtained access privileges and display right information, where formatting the document comprises:
      processing the one or more first portions of the document determined to be readable by the user; and
      processing the one or more second portions of the document determined to be unreadable by the user; and
   providing the processed one or more readable first portions and a representation of content associated with the processed one or more unreadable second portions to the client in response to the request.

2. The method of claim 1, where the information associated with the user comprises one or more of:
   information regarding a geographic location of the user;
   information relating to whether the client used by the user accepts cookies; and
   security information relating to the user.

3. The method of claim 1, further comprising:
   storing a plurality of versions of the document, stored versions of the document including subsets of the document; and
   selecting an appropriate version of the document from among the stored plurality of versions of the document responsive at least in part to the derived user access privileges to the document.

4. The method of claim 1, wherein the access rights associated with the document are granted by a source of the document for content of the document.

5. The method of claim 1, where the one or more second portions of the document include one or more images and the display right information indicates that the one or more images should be blocked when the portions of the document are provided to the client.

6. The method of claim 1, wherein processing the one or more second portions of the document determined to be unreadable by the user comprises blurring or blocking the one or more second portions of the document.

7. The method of claim 1, wherein the search query comprises one or more keywords and the identifying comprises identifying portions of the document that include the one or more keywords.

8. A non-transitory computer readable medium storing executable computer program instructions, the instructions executable to perform steps comprising:
   receiving a search query from a client used by a user;
   identifying portions of a document that are relevant to the search query;
   deriving user access privileges to the document based on information associated with the user and access rights associated with the document;
   determining based on the derived user access privileges to the document and display right information for the document, one or more first portions of the document relevant to the search query to be readable by the user and one or more second portions of the document relevant to the search query to be unreadable by the user;
   formatting the document based on the obtained access privileges and display right information, where formatting the document comprises:
      processing the one or more first portions of the document determined to be readable by the user; and
      processing the one or more second portions of the document determined to be unreadable by the user; and
   providing the processed one or more readable first portions and a representation of content associated with the processed one or more unreadable second portions to the client in response to the request.

9. The non-transitory computer readable medium of claim 8, where the information associated with the user comprises one or more of:
   information regarding a geographic location of the user;
   information relating to whether the client used by the user accepts cookies; and
   security information relating to the user.

10. The non-transitory computer readable medium of claim 8, the steps further comprising:
   storing a plurality of versions of the document, stored versions of the document including subsets of the document; and
   selecting an appropriate version of the document from among the stored plurality of versions of the document responsive at least in part to the derived user access privileges to the document.

11. The non-transitory computer readable medium of claim 8, wherein the access rights associated with the document are granted by a source of the document for content of the document.

12. The non-transitory computer readable medium of claim 8, where the one or more second portions of the document include one or more images and the display right information indicates that the one or more images should be blocked when the portions of the document are provided to the client.

13. The non-transitory computer readable medium of claim 8, wherein processing the one or more second portions of the document determined to be unreadable by the user comprises blurring or blocking the one or more second portions of the document.

14. The non-transitory computer readable medium of claim 8, wherein the search query comprises one or more keywords and the identifying comprises identifying portions of the document that include the one or more keywords.

15. A device comprising:
   a processor for executing computer program instructions; and
   a non-transitory computer readable medium storing executable computer program instructions, the instructions executable to perform steps comprising:
      providing a search query from a client used by a user to a server, wherein the server is adapted to:
         identify portions of a document that are relevant to the search query;
         derive user access privileges to the document based on information associated with the user and access rights associated with the document;
         determine based on the derived user access privileges to the document and display right information for the document, one or more first portions of the document relevant to the search query to be readable by the user and one or more second portions of the document relevant to the search query to be unreadable by the user;
         format the document based on the obtained access privileges and display right information, where formatting the document comprises:
            processing the one or more first portions of the document determined to be readable by the user; and
            processing the one or more second portions of the document determined to be unreadable by the user; and
         providing the processed one or more readable first portions and a representation of content associated with the processed one or more unreadable second portions to the device in response to the request; and
      receiving and displaying the processed one or more readable first portions and the representation of content associated with the processed one or more unreadable second portions.

16. The device of claim 15, where the information associated with the user comprises one or more of:
   information regarding a geographic location of the user;
   information relating to whether the client used by the user accepts cookies; and
   security information relating to the user.

17. The device of claim 15, the server further adapted to:
   store a plurality of versions of the document, stored versions of the document including subsets of the document; and
   select an appropriate version of the document from among the stored plurality of versions of the document responsive at least in part to the derived user access privileges to the document.

18. The device of claim 15, wherein the access rights associated with the document are granted by a source of the document for content of the document.

19. The device of claim 15, where the one or more second portions of the document include one or more images and the display right information indicates that the one or more images should be blocked when the portions of the document are provided to the client.

20. The device of claim 15, wherein processing the one or more second portions of the document determined to be unreadable by the user comprises blurring or blocking the one or more second portions of the document.

* * * * *